United States Patent
Shimono et al.

(10) Patent No.: US 7,750,963 B2
(45) Date of Patent: Jul. 6, 2010

(54) TIMING SIGNAL GENERATING CIRCUIT AND PHOTOGRAPHING DEVICE HAVING SAME CIRCUIT

(75) Inventors: Takashi Shimono, Fukuoka (JP); Hiroyasu Tagami, Fukuoka (JP)

(73) Assignee: Sony Corporation, Tokyo (JP)

( * ) Notice: Subject to any disclaimer, the term of this patent is extended or adjusted under 35 U.S.C. 154(b) by 752 days.

(21) Appl. No.: 11/179,960

(22) Filed: Jul. 12, 2005

(65) Prior Publication Data

US 2006/0028566 A1    Feb. 9, 2006

(30) Foreign Application Priority Data

Jul. 15, 2004    (JP) ................ P2004-208477

(51) Int. Cl.
*H04N 3/14* (2006.01)
*H04N 5/335* (2006.01)

(52) U.S. Cl. ............... 348/312; 348/295; 348/524; 348/521; 348/513; 348/536; 713/502; 713/400; 713/600

(58) Field of Classification Search ............. 348/295, 348/312, 524, 521, 513, 536; 713/502, 400, 713/600
See application file for complete search history.

(56) References Cited

U.S. PATENT DOCUMENTS

2001/0017659 A1 *  8/2001  Suzuki .................. 348/312
2002/0135690 A1 *  9/2002  Tashiro et al. ........... 348/312

FOREIGN PATENT DOCUMENTS

JP    2002-051270 A    2/2002

* cited by examiner

*Primary Examiner*—David L Ometz
*Assistant Examiner*—Antoinette T Spinks
(74) *Attorney, Agent, or Firm*—Sonnenschein Nath & Rosenthal LLP

(57) ABSTRACT

A circuit for generating a timing signal, the circuit having a memory and a pulse generator, the timing signal consisting of a number of pulses. The memory stores pulse count data, including an indication of the number of pulses in the timing signal, and rising edge and falling edge position data of the timing signal. The pulse generator produces the timing signal in accordance with the pulse count data and has a first circuit for generating rising edge signals, a second circuit for generating falling edge signals, an active control circuit for setting, in correspondence only with the pulse count data, corresponding rising edge signals as active state rising edge signals, and corresponding falling edge signals as active state falling edge signals, and a third circuit for generating said timing signal corresponding to the active state rising edge signals and the active state falling edge signals.

6 Claims, 7 Drawing Sheets

--Prior Art--

TIMING SIGNAL GENERATING CIRCUIT AND PHOTOGRAPHING DEVICE HAVING SAME CIRCUIT

RELATED APPLICATION DATA

The present application claims priority to Japanese Application(s) No(s). P2004-208477 filed Jul. 15, 2004, which application(s) is/are incorporated herein by reference to the extent permitted by law.

BACKGROUND OF THE INVENTION

The present invention relates to a timing signal generating circuit and a photographing device having the same circuit.

Digital still cameras and digital camcorders using a solid-state image pickup element including a CCD (Charge Coupled Device) and the like have a timing signal generating circuit for generating a plurality of kinds of timing signals for driving the solid-state image pickup element.

Recent cameras including this timing signal generating circuit have a plurality of kinds of photographing mode functions such as an auto focus mode, a high-speed shutter mode and the like in addition to an ordinary photographing mode.

The timing signal generating circuit therefore needs to generate a plurality of groups of the above-described plurality of kinds of timing signals for the respective photographing modes.

Known as a timing signal generating circuit for thus generating a plurality of kinds of timing signals is a timing signal generating circuit that has a memory therewithin, stores rising edge position data and falling edge position data of a plurality of kinds of timing signals to be generated in the memory in advance, and generates the plurality of kinds of timing signals using the rising edge position data and the falling edge position data stored in the memory (refer to, for example, Japanese Patent Laid-Open No. 2002-51270 (Patent Document 1)).

As shown in FIG. 7, this timing signal generating circuit 100 includes: a microcomputer interface 101 for receiving a control signal S100 input from a microcomputer; a RAM 102 for storing rising edge position data SET1 to SET4 and falling edge position data RST1 to RST4 of a plurality of timing signals S103 to be generated, on the basis of various setting signals S101 input from the microcomputer interface 101; and a pulse generator 103 for generating desired timing signals S103 using rising edge signals and falling edge signals S102 generated on the basis of the position data SET1 to SET4 and RST1 to RST4 stored in the RAM 102 as well as a vertical synchronizing signal VR and a horizontal synchronizing signal HR input from the microcomputer.

The RAM 102 forming the timing signal generating circuit 100 includes a plurality of mode areas M1 and M2 divided for each photographing mode and further includes, in each of the mode areas M1 and M2, a plurality of signal areas Va1 to Va8 divided for each of a plurality of timing signals S103 necessary in the mode.

All the signal areas Va1 to Va8 have eight timing storing areas n for storing pieces of rising edge position data SET1 to SET4 and falling edge position data RST1 to RST4 which pieces are equal in number to the number of pulses of the timing signal S103 having the largest number of pulses of all the timing signals S103 to be generated.

When the plurality of desired timing signals S103 are to be generated, the rising edge position data SET1 to SET4 and the falling edge position data RST1 to RST4 of the timing signals S103 are input to all the timing storing areas n. The pulse generator 103 combines the rising edge position data SET1 to SET4 and the falling edge position data RST1 to RST4 read from each of the signal areas Va1 to Va8, and thereby generates the plurality of desired timing signals S103.

SUMMARY OF THE INVENTION

Thus, in the conventional timing signal generating circuit 100, all the signal areas Va1 to Va8 have eight timing storing areas n for storing pieces of rising edge position data SET1 to SET4 and falling edge position data RST1 to RST4 which pieces are equal in number to the number of pulses of the timing signal S103 having the largest number of pulses (four pulses in this case) of all the timing signals S103 to be generated, and the rising edge position data SET1 to SET4 and the falling edge position data RST1 to RST4 of the timing signals S103 are input to all the timing storing areas n.

That is, even when of the plurality of timing signals S103 to be generated, a timing signal S103 having less than the maximum number of pulses is to be generated, rising edge position data SET1 to SET4 and falling edge position data RST1 to RST4 are stored in all the timing storing areas n at all times.

Therefore timing storing areas n unnecessary for the generation of the timing signal S103 store dummy rising edge position data and falling edge position data DM that are not actually used. Because of the timing storing areas n for storing the dummy rising edge position data and falling edge position data DM, it is difficult to reduce the storage capacity of the RAM 102.

In addition, since power is required even for the dummy rising edge position data and falling edge position data DM that are not actually used, it is difficult to reduce power consumption.

According to an embodiment of the present invention, there is provided a timing signal generating circuit including: a memory for storing rising edge position data and falling edge position data of pulses of a timing signal to be generated; and a pulse generator for generating the timing signal on a basis of the rising edge position data and the falling edge position data; wherein the memory stores pulse count data indicating a number of pulses of the timing signal, and the pulse generator includes rising edge signal generating circuits for generating rising edge signals on a basis of respective pieces of the rising edge position data, falling edge signal generating circuits for generating falling edge signals on a basis of respective pieces of the falling edge position data, an active control circuit for setting in an active state the rising edge signals and the falling edge signals generated by the rising edge signal generating circuits and the falling edge signal generating circuits that correspond in number to the pulse count data, and a pulse generating circuit for generating the timing signal on a basis of the rising edge signals and the falling edge signals set in the active state by the active control circuit.

Therefore, when a desired timing signal is to be generated, it is not necessary to store dummy rising edge position data and falling edge position data that are not actually used. The timing signal generating circuit can thus be formed using a relatively inexpensive memory with a low memory capacity to reduce manufacturing cost.

In addition, since power required for the dummy rising edge position data and falling edge position data is eliminated, it is possible to reduce power consumption.

According to another embodiment of the present invention, there is provided a photographing device including a timing signal generating circuit, wherein the timing signal generating circuit includes a memory for storing rising edge position data and falling edge position data of pulses of a timing signal to be generated, and a pulse generator for generating the timing signal on a basis of the rising edge position data and the falling edge position data, the memory stores pulse count data indicating a number of pulses of the timing signal, and the pulse generator includes rising edge signal generating circuits for generating rising edge signals on a basis of respective pieces of the rising edge position data, falling edge signal generating circuits for generating falling edge signals on a basis of respective pieces of the falling edge position data, an active control circuit for setting in an active state the rising edge signals and the falling edge signals generated by the rising edge signal generating circuits and the falling edge signal generating circuits that correspond in number to the pulse count data, and a pulse generating circuit for generating the timing signal on a basis of the rising edge signals and the falling edge signals set in the active state by the active control circuit.

Thus, since a relatively inexpensive memory with a low memory capacity can be used, manufacturing cost can be reduced, and a photographing device consuming less power can be provided.

DETAILED DESCRIPTION OF THE PREFERRED EMBODIMENTS

Figure 1:
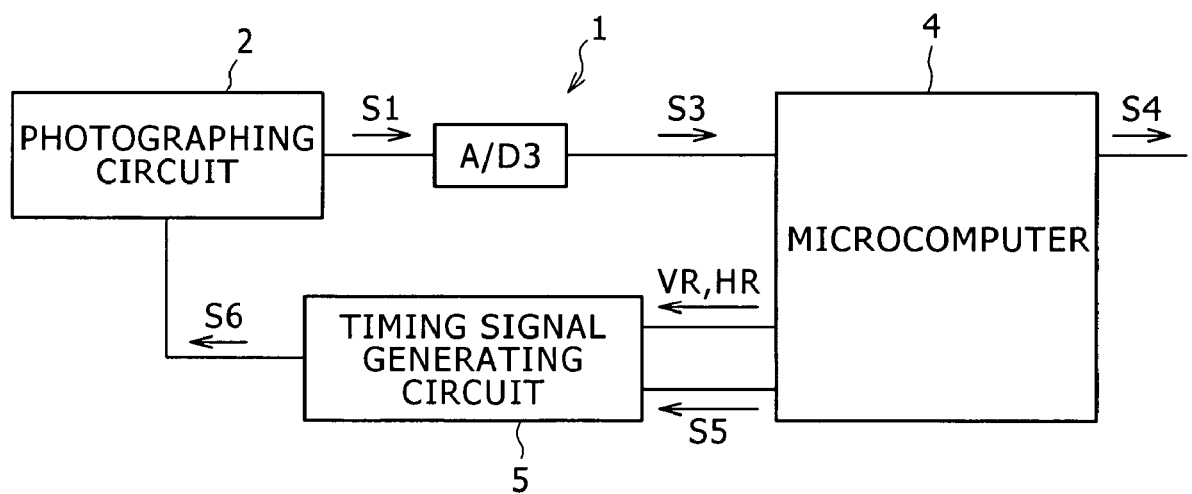
FIG. 1 is a block diagram showing a photographing device according to an embodiment of the present invention.

A photographing device according to an embodiment of the present invention has a timing signal generating circuit for generating a timing signal for driving an image pickup element.

This timing signal generating circuit has a memory for storing rising edge position data and falling edge position data of each pulse of the timing signal to be generated, and a pulse generator for generating the timing signal on the basis of the rising edge position data and the falling edge position data.

In particular, the memory included in the timing signal generating circuit stores pulse count data indicating the number of pulses of each timing signal to be generated.

The pulse generator has rising edge signal generating circuits for generating a rising edge signal for determining a rising edge of each timing signal on the basis of each piece of rising edge position data stored in the memory, and falling edge signal generating circuits for similarly generating a falling edge signal for determining a falling edge of each timing signal on the basis of each piece of falling edge position data stored in the memory.

In particular, the pulse generator has an active control circuit for setting in an active state rising edge signals and falling edge signals generated by the rising edge signal generating circuits and the falling edge signal generating circuits that correspond in number to the above-mentioned pulse count data.

The memory of the timing signal generating circuit can thereby be formed by a relatively inexpensive memory having a low memory capacity capable of storing only the pulse count data and pieces of rising edge position data and pieces of falling edge position data equal in number to the number of pulses of the timing signals to be generated.

Therefore the cost of manufacturing the timing signal generating circuit can be reduced.

In addition, the data amount of the rising edge position data and the falling edge position data stored in the memory can be reduced. The power consumption of the timing signal generating circuit can therefore be reduced.

The pulse generator also has a repeat circuit for making a pulse generating circuit perform signal output repeatedly a preset number of times.

In generating a timing signal in which a predetermined pattern appears repeatedly a predetermined number of times, this repeat circuit presets the number of repetitions of the predetermined pattern therein, and counts the repetitions of the predetermined pattern by a counter.

The repeat circuit makes the active control circuit operate until the counter has counted the preset number of repetitions, whereby the pulse generating circuit is made to perform signal output for a predetermined time.

The pulse generator further includes an offset circuit for making the pulse generating circuit stop signal output for a preset time.

This offset circuit holds all the timing signals in an inactive state for a predetermined time when supplied with a leading edge offset signal before the generation of the plurality of timing signals, and holds all the timing signals in the inactive state again for a predetermined time when supplied with a trailing edge offset signal after the generation of the plurality of timing signals.

Thereby, a plurality of complex timing signals can be generated without increasing the memory capacity. A wide variety of photographing modes can thus be realized.

As shown in FIG. 1, a photographing device 1 according to an embodiment of the present invention includes: a photographing circuit 2 formed by a CCD (Charge Coupled Device), a driving circuit for driving the CCD, and the like; an analog/digital converter 3 for converting an analog image signal S1 of an image taken by the photographing circuit 2 into a digital image signal S3; a microcomputer 4 for generating a video signal S4 by subjecting the digital image signal S3 input from the analog/digital converter 3 to digital image processing such as luminance and color difference processing and the like; and a timing signal generating circuit 5 for generating timing signals S6 for driving the CCD on the basis of various controls signals S5, a vertical synchronizing signal VR, a horizontal synchronizing signal HR and the like input from the microcomputer 4, and supplying the timing signals S6 to the photographing circuit 2.

Figure 2:
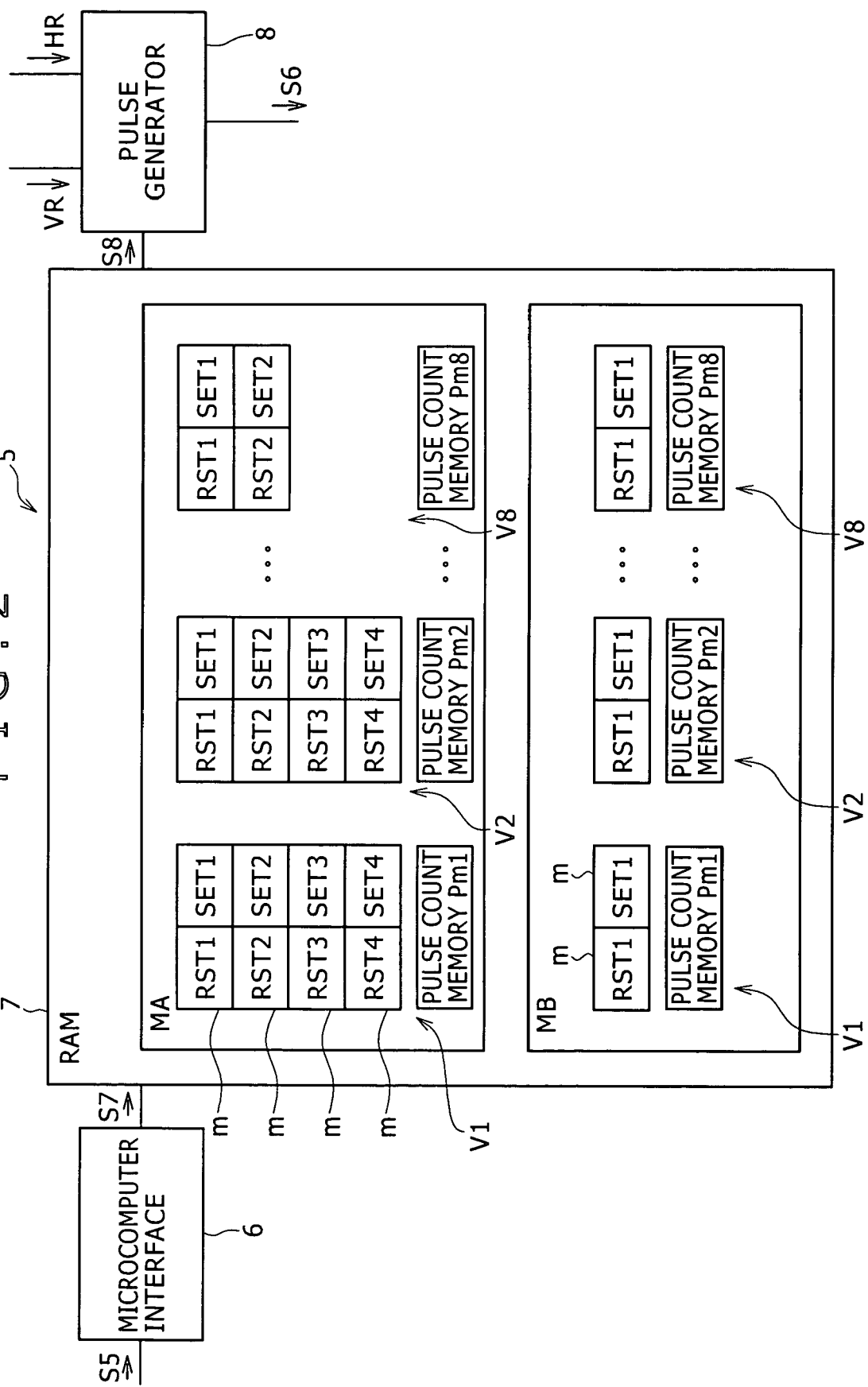
FIG. 2 is a block diagram showing a timing signal generating circuit included in the photographing device according to the embodiment of the present invention.

As shown in FIG. 2, the timing signal generating circuit 5 included in the photographing device 1 includes a microcomputer interface 6, a RAM (Random Access Memory) 7, and a pulse generator 8.

The microcomputer interface 6 is an interface circuit for outputting the various controls signals S5 input from the microcomputer 4 as a setting signal S7.

The RAM 7 is a storage circuit for storing rising edge position data SET indicating timing of a rising edge of each pulse of a plurality of kinds of timing signals S6 and falling edge position data RST indicating timing of a falling edge of each pulse of the plurality of kinds of timing signals S6.

The RAM 7 includes a plurality of mode areas MA and MB divided for each photographing mode and further includes, in each of the mode areas MA and MB, eight signal areas V1 to V8 divided for each of a plurality of timing signals necessary in the mode.

In particular, the signal areas V1 to V8 have timing storing areas m for storing a predetermined number of pieces of rising edge position data SET and a predetermined number of pieces of falling edge position data RST according to the number of pulses of each timing signal S6 used in each photographing mode.

That is, a signal area for generating a timing signal S6 having four pulses (the signal areas V1 and V2 in the mode area MA) has a total of eight timing storing areas m for storing four pieces of rising edge position data SET1 to SET4 and four pieces of falling edge position data RST1 to RST4. A signal area for generating a timing signal S6 having one pulse (the signal areas V1 to V8 in the mode area MB) has a total of two timing storing areas m for storing one piece of rising edge position data SET1 and one piece of falling edge position data RST1.

The RAM 7 further includes, in each of the signal areas V1 to V8, pulse count memories Pm1 to Pm8 for storing pulse count data indicating the number of pulses of the timing signal S6 to be generated.

The pulse generator 8 is a logic circuit that reads various parameters S8 including the pulse count data P_CNT, the rising edge position data SET, the falling edge position data RST, and the like from the RAM 7, and generates the timing signals S6 for driving the CCD on the basis of the parameters S8 and the vertical synchronizing signal VR and the horizontal synchronizing signal HR input from the microcomputer 4.

Figure 3:
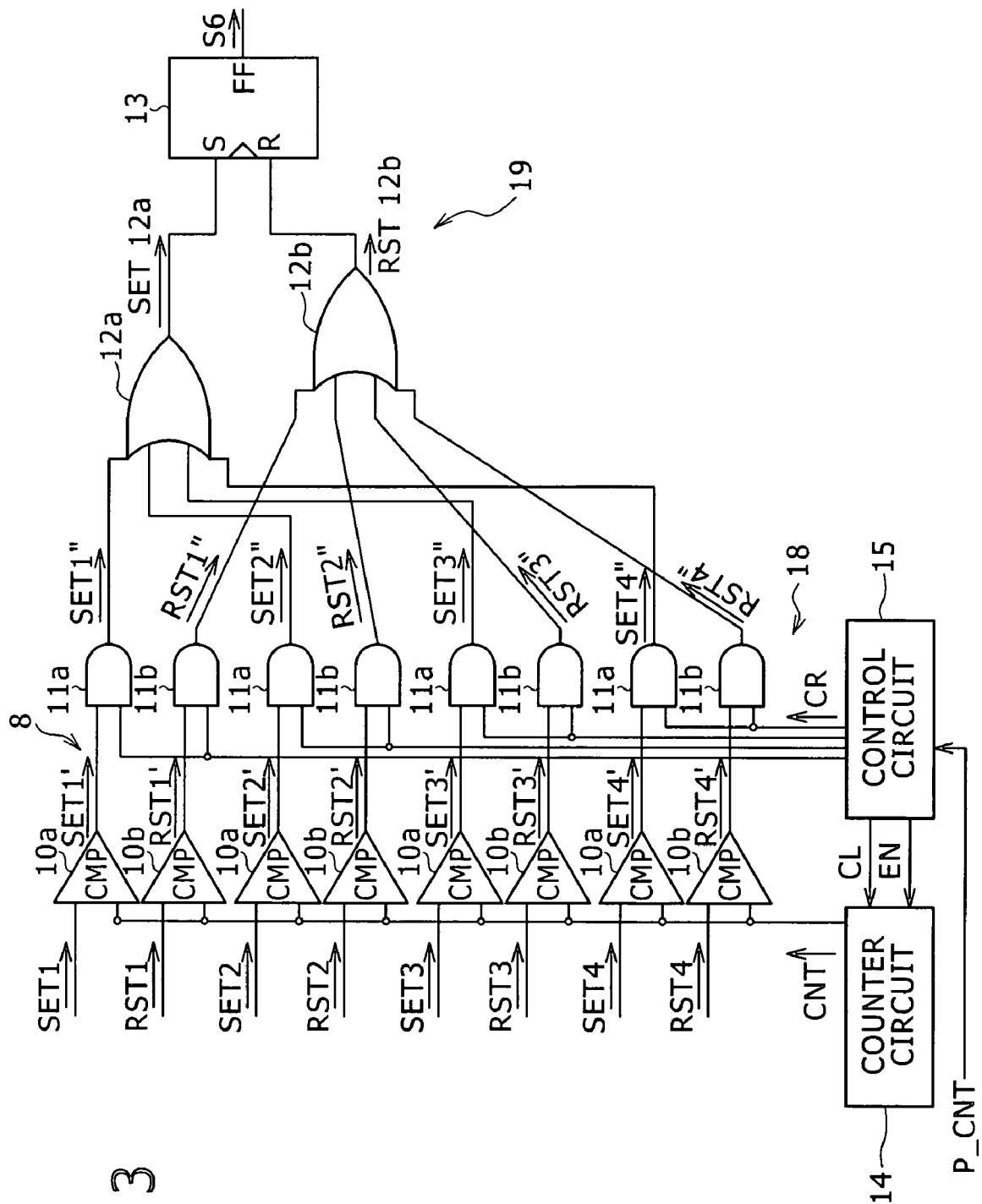
FIG. 3 is a circuit diagram showing a pulse generator included in the timing signal generating circuit according to the embodiment of the present invention.

As shown in FIG. 3, this pulse generator 8 includes: a plurality of rising edge signal generating circuits 10a for generating rising edge signals SET1' to SET4' on the basis of rising edge position data SET1 to SET4; a plurality of falling edge signal generating circuits 10b for generating falling edge signals RST1' to RST4' on the basis of falling edge position data RST1 to RST4; an active control circuit 18 for setting in an active state rising edge signals SET' and falling edge signals RST' generated by rising edge signal generating circuits 10a and falling edge signal generating circuits 10b corresponding in number to the above-mentioned pulse count data P_CNT; and a pulse generating circuit 19 for generating the timing signals S6 on the basis of the rising edge signals SET' and the falling edge signals RST' set in the active state by the active control circuit 18.

The plurality of rising edge signal generating circuits 10a are comparators that compare the rising edge position data SET1 to SET4 input from the RAM 7 with the count data CNT of a clock signal CL which data is input from a count circuit 14.

The rising edge signal generating circuits 10a then input the rising edge signals SET1' to SET4' rising in timing in which the values of the rising edge position data SET1 to SET4 become equal to the value of the count data CNT to rising edge AND logical circuits 11a.

The plurality of falling edge signal generating circuits 10b are comparators that compare the falling edge position data RST1 to RST4 input from the RAM 7 with the count data CNT of the clock signal CL which data is input from the count circuit 14.

The falling edge signal generating circuits 10b then input the falling edge signals RST1' to RST4' falling in timing in which the values of the falling edge position data RST1 to RST4 become equal to the value of the count data CNT to falling edge AND logical circuits 11b.

The active control circuit 18 includes: a plurality of the rising edge AND logical circuits 11a; a plurality of the falling edge AND logical circuits 11b; a control circuit 15 for controlling the operation of the plurality of rising edge AND logical circuits 11a and the plurality of falling edge AND logical circuits 11b; and the counter circuit 14.

The plurality of rising edge AND logical circuits 11a perform an AND operation on the rising edge signals SET1' to SET4' input respectively from the rising edge signal generating circuits 10a to the rising edge AND logical circuits 11a and respective control signals CR input from the control circuit 15. Thereby all or a part of rising edge selection signals SET1" to SET4" are selectively output from only the rising edge AND logical circuits 11a necessary to generate the desired timing signals S6 to a rising edge OR logical circuit 12a.

The plurality of falling edge AND logical circuits 11b perform an AND operation on the falling edge signals RST1' to RST4' input respectively from the falling edge signal generating circuits 10b to the falling edge AND logical circuits 11b and respective control signals CR input from the control circuit 15. Thereby all or a part of falling edge selection signals RST1" to RST4" are selectively output from only the falling edge AND logical circuits 11b necessary to generate the desired timing signals S6 to a falling edge OR logical circuit 12b.

The control circuit 15 inputs an enable signal EN for operating the counter circuit 14 and a clock signal CL to the counter circuit 14. Also, the control circuit 15 generates the control signals CR on the basis of the pulse count data P_CNT stored in the RAM 7, and then inputs the control signals CR to the rising edge AND logical circuits 11a and the falling edge AND logical circuits 11b. The control circuit 15 thereby performs control so that rising edge selection signals SET" and falling edge selection signals RST" are output only from rising edge AND logical circuits 11a and falling edge AND logical circuits 11b equal in number to the number of pulses of the timing signal S6 to be generated.

The counter circuit 14 is a counter that successively inputs count data CNT obtained by counting the clock signal CL input from the control circuit 15 to the rising edge signal generating circuits 10a and the falling edge signal generating circuits 10b while the enable signal EN input from the control circuit 15 is in an active state.

The pulse generating circuit 19 includes the rising edge OR logical circuit 12a, the falling edge OR logical circuit 12b, and a waveform synthesizing circuit 13.

The rising edge OR logical circuit 12a generates a rising edge determining signal SET12a for determining the rising edge positions of the timing signal S6 by performing an OR operation on the rising edge selection signals SET" input from the rising edge AND logical circuits 11a. The rising edge OR logical circuit 12a inputs the rising edge determining signal SET12a to the waveform synthesizing circuit 13.

The falling edge OR logical circuit 12b generates a falling edge determining signal RST12b for determining the falling edge positions of the timing signal S6 by performing an OR operation on the falling edge selection signals RST" input from the falling edge AND logical circuits 11b. The falling edge OR logical circuit 12b inputs the falling edge determining signal RST12b to the waveform synthesizing circuit 13.

The waveform synthesizing circuit 13 is an SR type flip-flop for generating the timing signal S6 that rises in timing of the rising edges of the rising edge determining signal SET12*a* and falls in timing of the falling edges of the falling edge determining signal RST.

Figure 4:
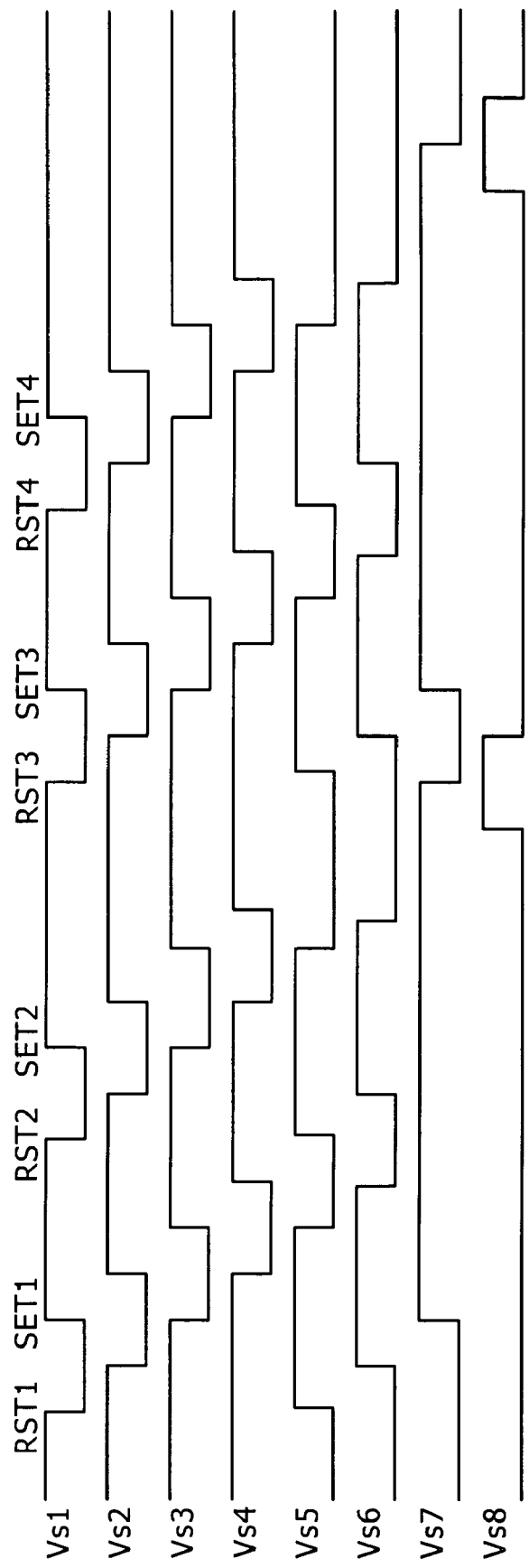
FIG. 4 is a timing chart showing timing signals generated by the pulse generator.

The thus formed timing signal generating circuit 5 generates different timing signals S6 Vs1 to Vs8 as shown in FIG. 4 as follows.

When a timing signal S6 having four pulses as with the timing signals S6 Vs1 to Vs6 is to be generated, the pulse count memories Pm1 to Pm6 provided in the RAM 7 shown in FIG. 2 store pulse count data P_CNT indicating that the number of pulses of the timing signal S6 to be generated is four, and the signal areas V1 to V6 within the mode area MA store the rising edge position data SET1 to SET4 and the falling edge position data RST1 to RST4 of the respective timing signals S6.

Then, the rising edge position data SET1 to SET4 and the falling edge position data RST1 to RST4 stored in the RAM 7 are input to the rising edge signal generating circuits 10*a* and the falling edge signal generating circuits 10*b*, respectively.

When an enable signal EN and a clock signal CL are input from the control circuit 15 to the counter circuit 14, the counter circuit 14 successively inputs count data CNT obtained by counting the clock signal CL to the rising edge signal generating circuits 10*a* and the falling edge signal generating circuits 10*b*.

The rising edge signal generating circuits 10*a* and the falling edge signal generating circuits 10*b* compare the value of the count data CNT input from the counter circuit 14 with the values of the rising edge position data SET1 to SET4 and the falling edge position data RST1 to RST4 input from the RAM 7. The rising edge signal generating circuits 10*a* and the falling edge signal generating circuits 10*b* input rising edge signals SET1' to SET4' rising in timing in which the values of the rising edge position data SET1 to SET4 become equal to the value of the count data CNT to the rising edge AND logical circuits 11*a*, and input falling edge signals RST1' to RST4' falling in timing in which the values of the falling edge position data RST1 to RST4 become equal to the value of the count data CNT to the falling edge AND logical circuits 11*b*.

At this time, the control circuit 15 generates control signals CR on the basis of the pulse count data P_CNT stored in the RAM 7 and indicating the number of four. The control circuit 15 inputs the control signals CR to the rising edge AND logical circuits 11*a* and the falling edge AND logical circuits 11*b*.

As a result of the input of the control signals CR, rising edge selection signals SET1" to SET4" are input from all the rising edge AND logical circuits 11*a* to the rising edge OR logical circuit 12*a*, and falling edge selection signals RST1" to RST4" are input from all the falling edge AND logical circuits 11*b* to the falling edge OR logical circuit 12*b*.

The rising edge OR logical circuit 12*a* sequentially inputs rising edge determining signals SET12*a* in order in which the rising edge selection signals SET1" to SET4" are input, to the waveform synthesizing circuit 13.

The falling edge OR logical circuit 12*b* sequentially inputs falling edge determining signals RST12*b* in order in which the falling edge selection signals RST1" to RST4" are input, to the waveform synthesizing circuit 13.

The waveform synthesizing circuit 13 generates the timing signals S6 Vs1 to Vs6 that rise in timing in which the rising edge determining signals SET12*a* rise and falls in timing in which the falling edge determining signals RST12*b* fall.

When a timing signal S6 having two pulses as with the timing signals S6 Vs7 and Vs8 is to be generated, the pulse count memories Pm7 and Pm8 store pulse count data indicating that the number of pulses of the timing signal S6 to be generated is two, and the signal areas V7 and V8 within the mode area MA store the rising edge position data SET1 and SET2 and the falling edge position data RST1 and RST2 of the respective timing signals S6.

Then, the rising edge position data SET1 and SET2 and the falling edge position data RST1 and RST2 stored in the RAM 7 are input to the rising edge signal generating circuits 10*a* and the falling edge signal generating circuits 10*b* corresponding to the rising edge position data SET1 and SET2 and the falling edge position data RST1 and RST2, respectively.

When an enable signal EN and a clock signal CL are input from the control circuit 15 to the counter circuit 14, the counter circuit 14 successively inputs count data CNT obtained by counting the clock signal CL to the rising edge signal generating circuits 10*a* and the falling edge signal generating circuits 10*b*.

The rising edge signal generating circuits 10*a* and the falling edge signal generating circuits 10*b* compare the value of the count data CNT input from the counter circuit 14 with the values of the rising edge position data SET1 and SET2 and the falling edge position data RST1 and RST2 input from the RAM 7. The rising edge signal generating circuits 10*a* and the falling edge signal generating circuits 10*b* input rising edge signals SET1' and SET2' rising in timing in which the values of the rising edge position data SET1 and SET2 become equal to the value of the count data CNT to the rising edge AND logical circuits 11*a*, and input falling edge signals RST1' and RST2' falling in timing in which the values of the falling edge position data RST1 and RST2 become equal to the value of the count data CNT to the falling edge AND logical circuits 11*b*.

At this time, the control circuit 15 generates control signals CR on the basis of the pulse count data P_CNT stored in the RAM 7 and indicating the number of two. The control circuit 15 inputs the control signals CR to the rising edge AND logical circuits 11*a* and the falling edge AND logical circuits 11*b*.

As a result of the input of the control signals CR, rising edge selection signals SET1" and SET2" are input from the rising edge AND logical circuits 11*a* corresponding to the rising edge signals SET1' and SET2' to the rising edge OR logical circuit 12*a*, and falling edge selection signals RST1" and RST2" are input from the falling edge AND logical circuits 11*b* corresponding to the falling edge signals RST1' and RST2' to the falling edge OR logical circuit 12*b*.

The rising edge OR logical circuit 12*a* sequentially inputs rising edge determining signals SET12*a* in order in which the rising edge selection signals SET1" and SET2" are input, to the waveform synthesizing circuit 13.

The falling edge OR logical circuit 12*b* sequentially inputs falling edge determining signals RST12*b* in order in which the falling edge selection signals RST1" and RST2" are input, to the waveform synthesizing circuit 13.

The waveform synthesizing circuit 13 generates the timing signals S6 Vs7 and Vs8 that rise in timing in which the rising edge determining signals SET12*a* rise and falls in timing in which the falling edge determining signals RST12*b* fall.

Thus, by changing the values of the pulse count data P_CNT stored in the pulse count memories Pm1 to Pm8 according to the numbers of pulses of the timing signals S6 to be generated, it is possible to reduce the number of pieces of rising edge position data SET and falling edge position data RST stored in the signal areas V1 to V8 to a minimum required number.

Therefore, the plurality of complex timing signals S6 can be generated without increasing the storage capacity of the RAM 7.

Figure 5:
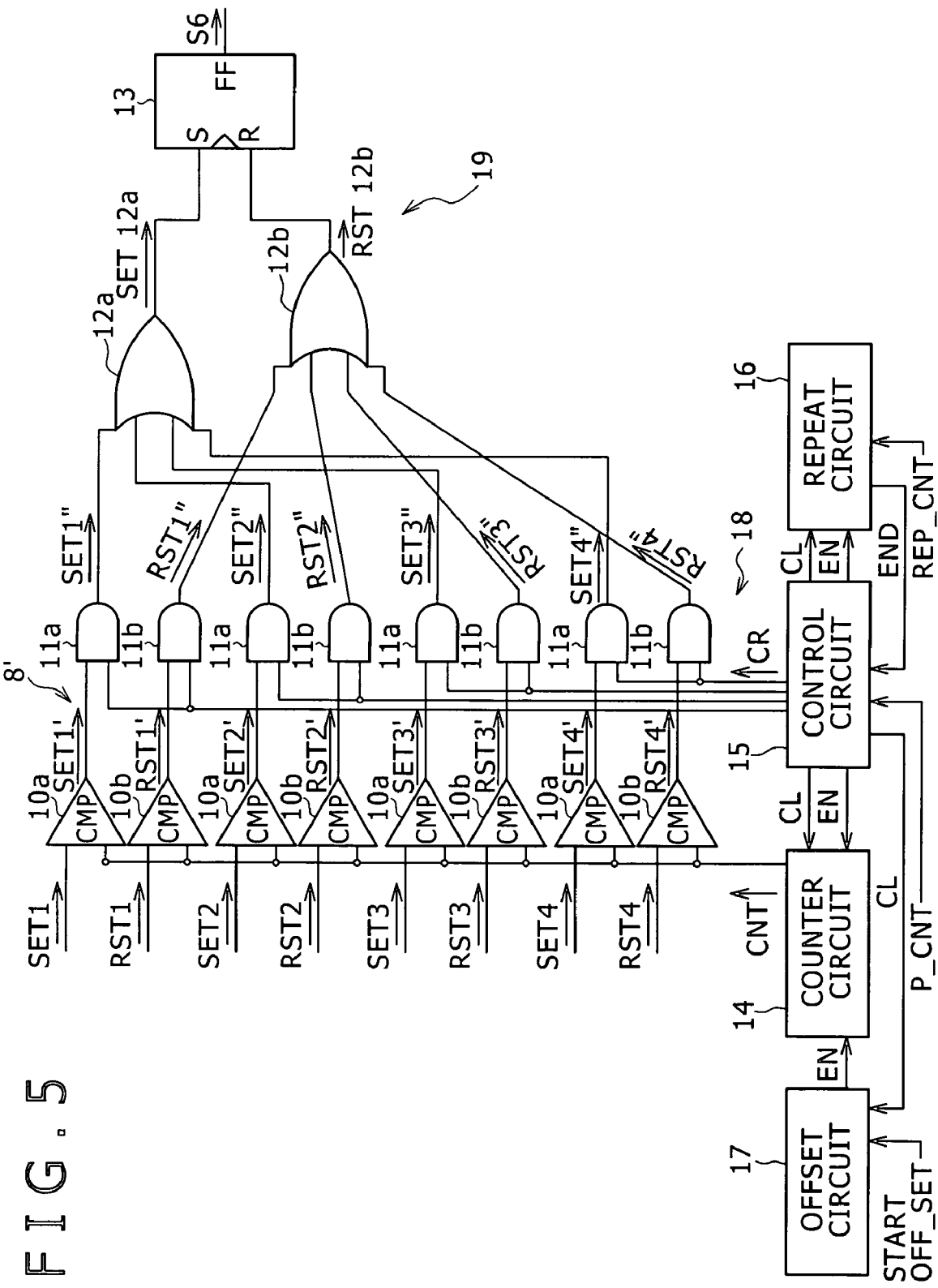
FIG. 5 is a circuit diagram showing another embodiment of the pulse generator.
Figure 6:
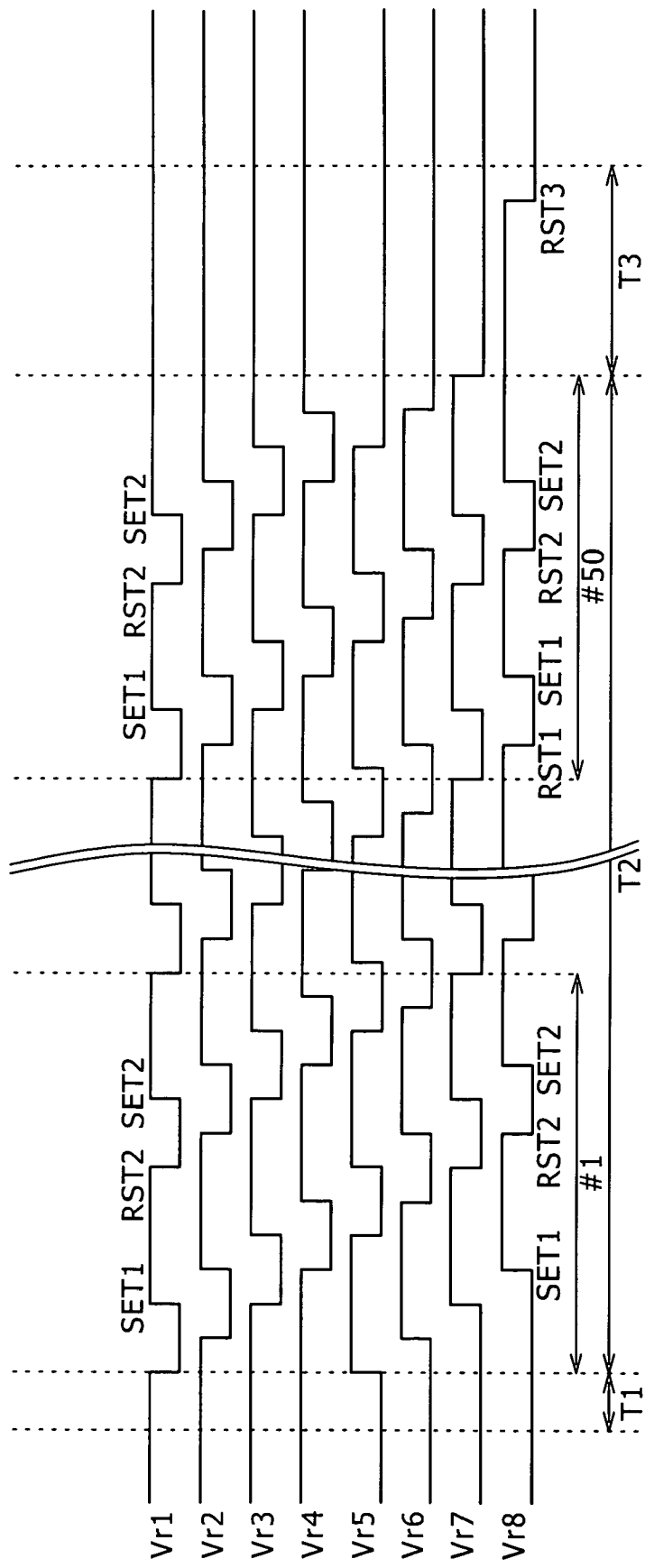
FIG. 6 is a timing chart showing timing signals generated by the pulse generator.
Figure 7:
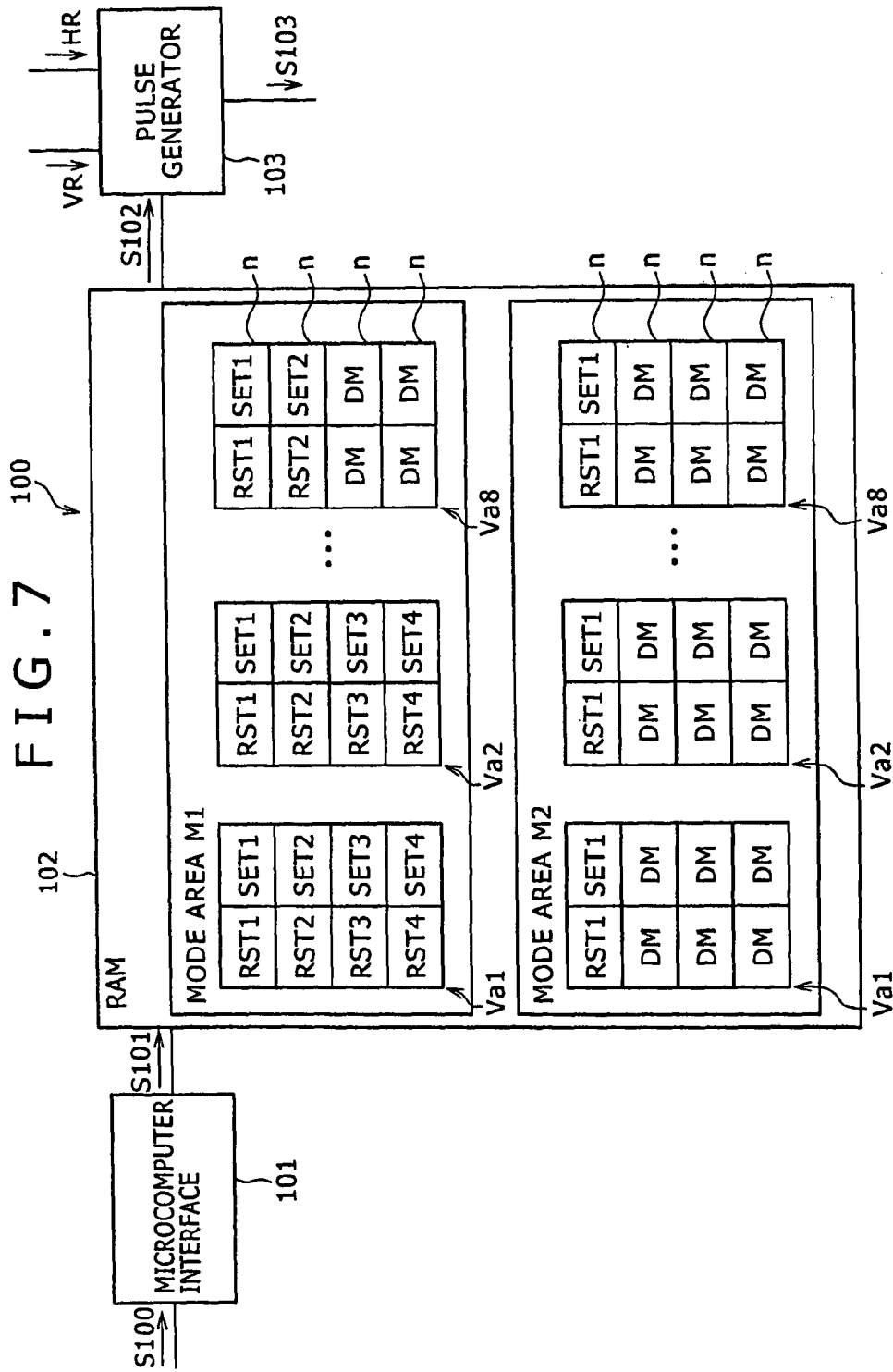
FIG. 7 is a block diagram showing a conventional timing signal generating circuit.

Another embodiment of the pulse generator 8 of the timing signal generating circuit 5 will next be described with reference to FIG. 5 and FIG. 6.

A pulse generator 8' according to this embodiment is formed by providing a repeat circuit 16 and an offset circuit 17 to the pulse generator 8 shown in FIG. 3. Incidentally, in description of the pulse generator 8', the same components as in the pulse generator 8 shown in FIG. 3 are identified by the same reference numerals.

This pulse generator 8' includes the repeat circuit 16 for making a pulse generating circuit 19 perform signal output repeatedly a preset number of times, and the offset circuit 17 for making the pulse generating circuit 19 stop signal output for a preset time. The pulse generator 8' can thereby generate timing signals S6 Vr1 to Vr8 in which a predetermined pattern #1 as shown in FIG. 6 is repeated 50 times.

When such timing signals S6 Vr1 to Vr8 are to be generated, a leading edge offset signal STARTOFF_SET is first input to the offset circuit 17.

After the leading edge offset signal STARTOFF_SET is input, the offset circuit 17 counts a clock signal CL for a predetermined time T1. The offset circuit 17 then outputs an enable signal EN to a counter circuit 14.

At the same time that the enable signal EN is input, the counter circuit 14 starts counting the clock signal CL, and inputs count data CNT to rising edge signal generating circuits 10a and falling edge signal generating circuits 10b to start the generation of the timing signals S6.

Thus, by inputting the leading edge offset signal START-OFF_SET to the offset circuit 17, signal output from the pulse generating circuit 19 is stopped for the predetermined time T1 before the generation of the timing signals S6.

Next, the timing signals S6 Vr1 to Vr8 forming the predetermined pattern #1 are generated as in the case of generating the timing signals S6 Vs1 to Vs8 shown in FIG. 4.

In this case, on the basis of control signals CR, rising edge selection signals SET1" and SET2" are input to a rising edge OR logical circuit 12a, and falling edge selection signals RST1" and RST2" are input to a falling edge OR logical circuit 12b.

The repeat circuit 16 is supplied in advance with a repetition count signal REP_CNT for setting the number of repetitions (50 times in this case) of the predetermined pattern #1.

Then, the repeat circuit 16 counts the number of times that an enable signal EN is input from the control circuit 15, the enable signal EN being input each time one pattern of the timing signals S6 in the same pattern as the predetermined pattern #1 is output. When the number of times that the enable signal EN is input reaches 50, the repeat circuit 16 inputs an ending signal END for ending the generation of the timing signals S6 to the control circuit 15.

Thus, by inputting the repetition count signal REP_CNT to the repeat circuit 16 in advance, the predetermined pattern #1 is repeated a preset number of times so that signal output from the pulse generating circuit 19 is performed for a predetermined time T2.

At the same time that the ending signal END is input to the control circuit 15, the control circuit 15 changes the control signals CR, and clears the counter value of the counter circuit 14 by the ending signal END.

Thereafter, the control circuit 15 outputs an enable signal EN to the counter circuit 14 for a predetermined time T3 set in advance. Incidentally, the predetermined time T3 set in the control circuit 15 can be set and changed externally.

The counter circuit 14 counts the clock signal CL during the predetermined time T3 during which the enable signal EN is input from the control circuit 15. In response to the input of the control signals CR, a rising edge selection signal SET3" is input from a rising edge AND logical circuit 11a corresponding to a rising edge signal SET3' to the rising edge OR logical circuit 12a, and a falling edge selection signal RST3" is input from a falling edge AND logical circuit 11b corresponding to a falling edge signal RST3' to the falling edge OR logical circuit 12b.

Thus, after the timing signals S6 are generated in the predetermined time T2, the timing signals S6 for the predetermined time T3 are generated.

Thus, by providing the repeat circuit 16 and the offset circuit 17 to the pulse generator 8, it is possible to generate the plurality of more complex timing signals S6 without increasing the storage capacity of the RAM 7.

It should be understood by those skilled in the art that various modifications, combinations, sub-combinations and alterations may occur depending on design requirements and other factors insofar as they are within the scope of the appended claims or the equivalents thereof.

What is claimed is:

1. A timing signal generating circuit comprising a memory and a pulse generator, wherein:

the memory stores information related to a timing signal, said timing signal comprising a number of pulses, said information comprising (i) pulse count data indicating the number of pulses of said timing signal, (ii) rising edge position data of the timing signal, and (iii) falling edge position data of the timing signal, and the pulse generator produces said timing signal corresponding to the stored information, said pulse generator comprising a first circuit for generating rising edge signals corresponding to respective pieces of said rising edge position data, a second circuit for generating falling edge signals corresponding to respective pieces of said falling edge position data, an active control circuit for setting in an active state: (i) rising edge signals generated by a first circuit, and (ii) falling edge signals generated by said second circuit, and a third circuit for generating said timing signal corresponding to the active state rising edge signals and the active state falling edge signals, wherein, said active control circuit performs setting in an active state responsive only to a single one of (i) pulse count data indicating the number of pulses of said timing signal, (ii) rising edge position data of the timing signal, and (iii) falling edge position data of the timing signal.

2. The timing signal generating circuit as claimed in claim 1, wherein said pulse generator has a repeat circuit for making said third circuit perform signal output repeatedly a preset number of times.

3. The timing signal generating circuit as claimed in claim 1 or 2, wherein said pulse generator has an offset circuit for making said third circuit stop signal output for a preset time.

4. A photographing device comprising a timing signal generating circuit, wherein said timing signal generating circuit comprises a memory and a pulse generator, wherein:

the memory stores information related to a timing signal, said timing signal comprising a number of pulses, said information comprising (i) pulse count data indicating the number of pulses of said timing signal, (ii) rising edge position data of the timing signal, and (iii) falling edge position data of the timing signal, and the pulse generator produces said timing signal corresponding to the stored information, said pulse generator comprising a first circuit for generating rising edge signals corresponding to respective pieces of said rising edge position data, a second circuit for generating falling edge signals corresponding to respective pieces of said falling edge position data, an active control circuit for setting in an active state: (i) rising edge signals generated by a first circuit, and (ii) falling edge signals generated by said second circuit, and a third circuit for generating said timing signal corresponding to the active state rising edge signals and the active state falling edge signals, wherein, said active control circuit performs setting in an active state responsive only to a single one of (i) pulse count data indicating the number of pulses of said timing signal, (ii) rising edge position data of the timing signal, and (iii) falling edge position data of the timing signal.

5. The photographing device as claimed in claim 4, wherein said pulse generator has a repeat circuit for making said third circuit perform signal output repeatedly a preset number of times.

6. The photographing device as claimed in claim 4 or 5, wherein said pulse generator has an offset circuit for making said third circuit stop signal output for a preset time.

\* \* \* \* \*